Patented May 26, 1953

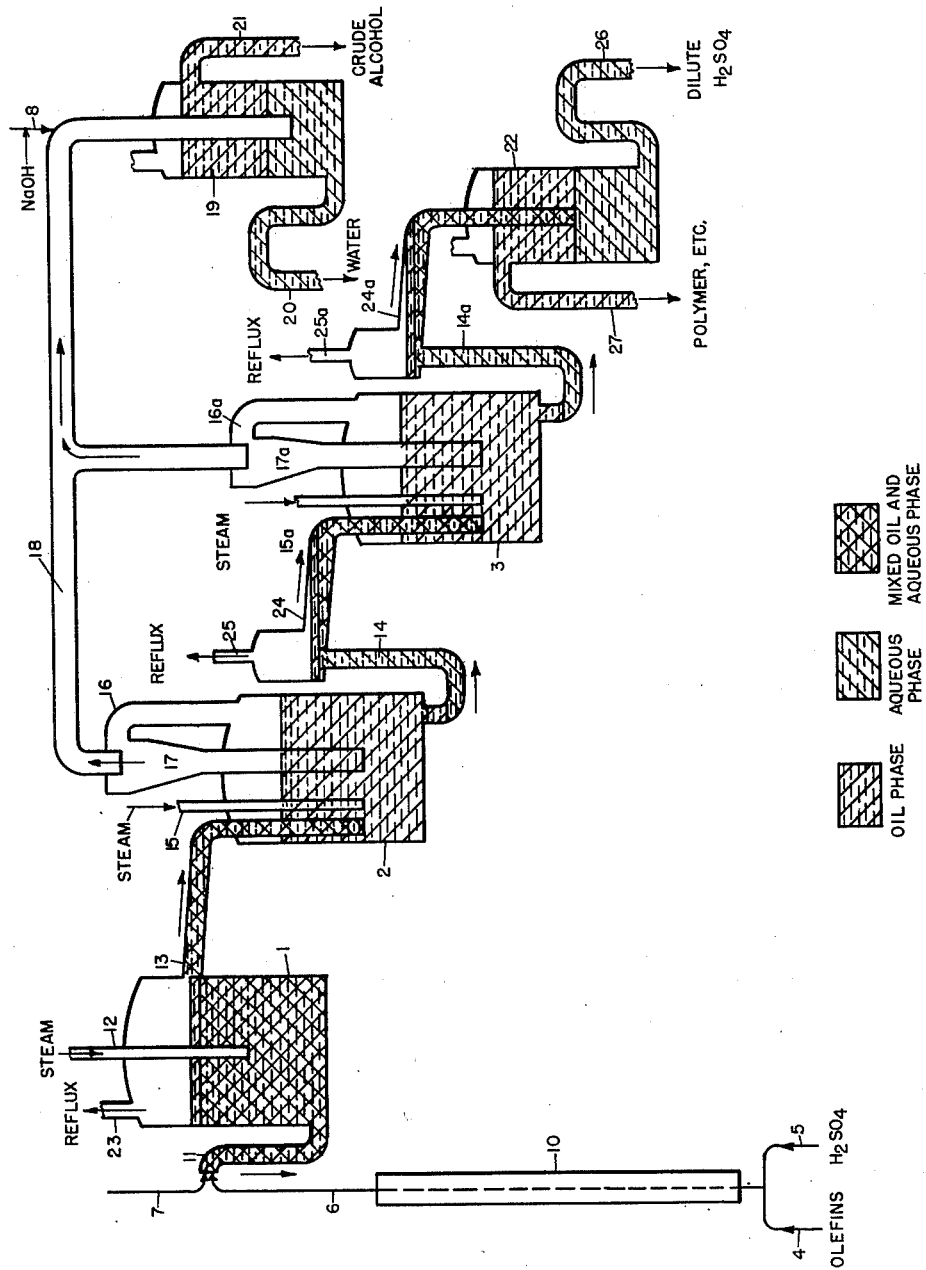

2,640,085

UNITED STATES PATENT OFFICE 2,640,085

MANUFACTURE OF ALCOHOL

Leslie Newton Goldsbrough, Thornton-le-Moors, England, assignor to Shell Development Company, San Francisco, Calif., a corporation of Delaware Application October 15, 1949, Serial No. 121,529
In Great Britain November 2, 1948

8 Claims. (Cl. 260—639)

This invention relates to the manufacture of alcohols which are sparingly soluble or insoluble in water and volatile with steam. It deals with an improved method for producing such alcohols by acid hydrolysis of mixtures of the corresponding acid and neutral esters of polybasic inorganic acids. It is also concerned with apparatus which is especially advantageous for carrying out this process.

The invention is thus concerned with the hydrolysis of mixtures containing at least one mono-ester and at least one polyester of a polybasic inorganic acid yielding an alcohol or mixture of alcohols which is sparingly soluble or insoluble in water and volatile with steam, which ester mixture contains dilute aqueous acid sufficient in amount at least to initiate the hydrolysis of the said acid ester. Ester mixtures of this type useful as starting materials for the new process may advantageously be obtained, for example, by reacting olefinic hydrocarbons with polybasic inorganic acids such as sulfuric acid, phosphoric acid, boric acid and the like. The mixtures of mono- and di-alkyl sulfates readily obtainable on a commercial scale by treating a higher olefin or a mixture of such olefins with strong sulfuric acid are convenient starting mixtures, particularly when derived from the vapor phase cracking of a petroleum wax, such as paraffin, as described, for instance, in U. S. Patent 2,172,228. In the interest of conciseness, the application of the invention to the hydrolysis of mixtures containing at least one mono- and at least one di-alkyl sulfate yielding an alcohol or alcohols which is or are sparingly soluble or insoluble in water and volatile in steam, and containing dilute acid, such as dilute sulfuric acid, sufficient in amount at least to initiate the hydrolysis of the said mono-alkyl sulfate, will be emphasized in the following description, and, for the sake of simplicity, these preferred starting mixtures will be hereinafter referred to as "acid mixtures of mono- and di-alkyl sulfates." However, it will be understood that other analogous mixtures of mono- and poly-esters from the same or other inorganic polybasic acids and other mono-olefinic hydrocarbons may be used in the invention in the same way.

Several different methods have been proposed for carrying out the acid hydrolysis of alkyl sulfates. A tower-type hydrolyzer, for example, has been frequently used for the hydrolysis of diluted sulfation reaction mixtures. For the hydrolysis of lower alkyl esters, such methods are often quite satisfactory, but, in carrying out the acid hydrolysis of mixtures consisting of or containing higher mono- and di-alkyl esters, difficulties are encountered owing to the fact that the hydrolysis of the di-alkyl sulfate takes considerably longer than that of the mono-alkyl sulfate. If the residence time of the mixture in the reaction vessel is sufficiently great for the hydrolysis of the bulk of the di-alkyl sulfate to be completed, a substantial fraction of the potential yield of alcohol is liable to be lost owing to dehydration of alcohol to olefin by the acid, the concentration of which increases as the hydrolysis proceeds.

An important object of the present invention is to provide a process for hydrolyzing esters of polybasic inorganic acids which overcomes the foregoing difficulties. Another object is to provide a continuous method of hydrolyzing mixtures of higher alkyl mono-sulfate and di-sulfates, whereby increased yields of alcohol are obtained while at the same time the size of the reaction system required for a given throughput is reduced. Still another object is to provide an improved apparatus for carrying out reactions of this type in a more economical and efficient manner. Further objects and advantages of the invention will be apparent from the following description of the principles on which it is based and illustrative examples of some of its applications.

In accordance with the invention, the hydrolysis of acid mixtures of mono- and di-alkyl sulfates, for example, is carried out in at least two reactors arranged in series, wherein the mixture is heated in the first reactor to hydrolyze all or most of the mono-alkyl sulfate, and the reaction product passes into the second reactor and separates therein into two layers of which the lower aqueous acid layer flows out of the reactor more rapidly than the upper oily layer, and the oily layer is subjected in the said reactor to steam distillation which removes the alcohol therefrom and brings about the hydrolysis of di-alkyl sulfate and of any non-hydrolyzed mono-alkyl sulfate which may still be present. The process is preferably carried out continuously with the reaction mixture flowing directly from the first to the second reactor.

The invention also comprises apparatus for carrying out the process described above, which comprises at least two reactors arranged in series for cascade flow, the first reactor being adapted to be heated and having at its upper portion a discharge pipe leading to the second reactor, which latter reactor is provided with a steam injection pipe, an outlet for vapor, and a discharge pipe leading from the lower portion of the reactor and having an upright limb such that in operation the level of the liquid retained in the reactor is controlled mainly by the balance between the hydrostatic pressure due to the said liquid and that due to the liquid in the upright limb of the discharge pipe.

Owing to the more rapid flow of the aqueous acid layer from the second reactor, coupled with the removal of alcohol by steam distillation as it is formed, the residence time of the di-alkyl sulfate contained in the oily layer can be increased to the extent required for substantially complete hydrolysis, without the loss of any appreciable quantity of alcohol by dehydration. Moreover, owing to the relatively short residence time of the aqueous phase and to the continuous removal of alcohol, a long residence time of the di-alkyl sulfate can be achieved in a comparatively small reaction system.

Since, as in all continuous reaction systems, it is not usually practicable to ensure that every part of the fluid has the same residence time, it is preferred to provide at least one further reactor in series with the aforesaid second reactor, the function and mode of operation of this third reactor and of any subsequent reactors being the same as that of the second reactor. The effluent from the final reactor may advantageously be passed to a separating vessel to separate any residual oily phase consisting, for example, of polymers, from the out-flowing dilute sulfuric acid.

The heat for the first reactor may conveniently be supplied by injecting steam into the reactor mixture. If desired, this steam may also be utilized for carrying out a limited steam distillation of the alcohol produced in the reactor and of any steam-violatile impurities which may be present. In this way the amount of steam distillation required in the second and subsequent reactors is reduced and the residence time of the oily layer in these reactors is increased. The amount of steam distillation which can be carried out in the first reactor is, however, limited by the tendency of the aqueous phase containing mono-alkyl sulfate to froth.

As has previously been mentioned, the alkyl sulfates used as starting materials may conveniently be obtained by the sulfation of individual olefins or olefin mixtures, for example, olefins containing from 5 to 12 carbon atoms in the molecule. The mixtures of mono- and di-alkyl sulfates derived from sulfation of cracked wax distillates of 7 to 9 carbon atoms are especially useful. Since strong sulfuric acid is used for these sulfation reactions, the reaction product should be diluted with water before or as it is fed into the first hydrolysis reactor. Most preferably, the dilution is carried out so as to give a sulfuric acid concentration of about 15% by weight (3 N acid) on an organic-free basis in the initial mixture to promote rapid hydrolysis of the mono-alkyl sulfates, and the acid concentration throughout the process is maintained below 30% by weight on an organic-free basis in order to minimize alcohol dehydration.

It is also possible to start with mixtures of mono- and di-alkyl sulfates which are initially free from acid, and to form the acid mixture by the addition of dilute acid to the mixture of sulfates before or as it is fed into the first hydrolysis reactor.

The invention will now be described in greater detail, by way of example reference being had to the accompanying drawing which shows in diagrammatic form, also by way of example, a cascade apparatus for carrying out the invention.

Referring to the drawing, 10 represents a sulfation reactor. An olefin or a mixture of olefins obtained, for example, from cracked paraffin wax, is fed into the reactor 10 by line 4, and strong sulfuric acid is fed in by line 5. The reaction product, which consists mainly of a mixture of mono- and di-alkyl sulfates and sulfuric acid, together with polymers or other by-products and unconverted hydrocarbons, is fed by line 6 to line 11 into which a quantity of water is fed by line 7. Pipe 11 leads to the bottom of the first cascade reactor 1. Steam is passed through the pipe 12 into the mixture in this reactor and heats the mixture so that the bulk of the mono-alkyl sulfate is hydrolyzed. In the example now being described, steam distillation of alcohol is not carried out in reactor 1, the steam serving essentially as a source of heat. There may be a slight separation into layers in the reactor, as indicated in the drawing, the phases being denoted in the drawing by lined and dotted shading, as shown in the key. The contents of reactor 1 pass through a pipe 13 into the second cascade reactor 2.

In reactor 2, the mixture separates readily into an upper oily layer and a lower acid aqueous layer. The lower aqueous layer, which consists mainly of sulfuric acid and water, runs through the reactor in a comparatively short time and flows out through a pipe 14 leading from the bottom of the reactor. The upper oily layer, which consists mainly of alcohol, di-alkyl sulfate, polymers or other by-products and unconverted hydrocarbons, remains for a longer period in the reactor and is subjected to the action of steam injected through a pipe 15. This steam acts as a source of heat and also serves to agitate the contents of the reactor, bringing the dilute acid into contact with the di-alkyl sulfate. The steam thus brings about hydrolysis of the di-alkyl sulfate and of any mono-alkyl sulfate which may have escaped hydrolysis in reactor 1, the hydrolysis of the latter being completed as the aqueous phase passes down from the pipe 13 through the oily phase. At the same time the steam acts as a distillation medium for removing the alcohol from the reaction sphere. The mixed steam and alcohol vapors pass up the offtake pipe 16 and into the vapor line 18, via a cyclone 17 which removes entrained droplets of liquid and returns them to reactor 2.

The pipe 14 leads into the third cascade reactor 3, which is similar to reactor 2, being provided with a steam pipe 15a, an off-take pipe 16a and a cyclone 17a. The composition of the layers formed in reactor 3 is similar to those in reactor 2, and the processes of hydrolysis and steam distillation are completed in the oily layer in reactor 3.

The vapor mixture in the vapor line, which contains any unconverted hydrocarbons and regenerated olefins, in addition to the alcohol and water vapor, is passed to a distillate separator 19 in which the vapor condenses and the condensate separates into a lower layer consisting of water and an upper layer containing the crude alcohol, that is to say the alcohol mixed with unconverted hydrocarbons and olefins. Caustic soda may be injected by line 8 to remove traces of sulfur dioxide from the alcohol. The water flows out through pipe 20 and the crude alcohol is led through pipe 21 to a distillation column for purification.

The efflux from reactor 3 passes into a separator 22 and separates into a lower layer of dilute sulfuric acid which is removed by line 26 and an upper layer of polymer or other by-products which is taken off by line 27.

The pipes 14 and 14a are provided with siphon breakers 24, 24a, vented to atmosphere through reflux condensers 25, 25a, only partly shown. The reactor 1 is also shown fitted with a reflux condenser 23, also only partly shown.

The residence times of the mono- and di-alkyl sulfates in the hydrolysis reactors are determined by the rate of input of the reactants, the sizes of the vessels and the liquid levels maintained therein, and, in the case of the di-alkyl sulfate, by the rate of steam stripping of the other constituents of the oily layer. As a general rule, a residence time of about 15 to 60 minutes, preferably about 20 to 40 minutes, in reactor 1 will effect sufficient hydrolysis of the mono-esters when using a temperature within the preferred range of about 80° C. to 120° C. For hydrolysis of the poly-esters in reactors 2 and 3, residence times for the poly-esters should preferably total at least 3 hours and, more advantageously, be of the order of 4 to 6 hours when using steam distillation at atmospheric pressure. With higher or lower temperatures of hydrolysis such as obtained when steam distillation under superatmospheric or subatmospheric pressure is used, the residence time for the poly-esters is reduced or increased correspondingly. An illustration of feed rates for the various reactants and the resulting output of the products at various stages of the process, using apparatus so designed that the volume of liquid held in each of the reactors 1, 2 and 3 at the steady state is 17.5 gallons, is given by way of example in the following table, in which the figures represent lbs./hour:

| Component | Reactor 10 In | Reactor 10 Out | Reactor 1 In | Reactor 1 Out | Reactor 2 Out | Reactor 3 Out |
|---|---|---|---|---|---|---|
| Oily Layer: | | | | | | |
| Paraffinic hydrocarbons | [1] 6.0 | 6.0 | 6.0 | 6.0 | 0 | 0 |
| Olefin | [1] 98.0 | 0 | 0 | 3.5 | 0 | 0 |
| Polymer (or other byproduct) | | 24.5 | 24.5 | 24.5 | 24.5 | 24.5 |
| Alcohol | | | | 41.4 | 11.8 | 0 |
| Di-alkyl sulfate | | 52.5 | 52.5 | 52.5 | 13.1 | 0 |
| Aqueous Layer: | | | | | | |
| Sulfuric acid | 122.5 | 66.5 | 66.5 | 105.0 | 118.1 | 122.5 |
| Water | 9.3 | 9.3 | 352.3 | 345.9 | 343.2 | 342.5 |
| Mono-alkylsulfate | | 77.0 | 77.0 | 0 | 0 | 0 |
| Steam Distillate: | | | | | | |
| Paraffinic hydrocarbons | | | | | 6.0 | |
| Olefin | | | | | 14.8 | 0.7 |
| Alcohol | | | | | 47.3 | 17.5 |

[1] From a cracked wax distillate containing mainly $C_7$ material.

Thus, the total yield of secondary heptyl alcohol (B. P. 159° C.) was 64.8 lbs. per hour.

In the same way using sulfation products of a $C_8$ fraction of cracked wax olefins as feed, a yield of secondary octyl alcohol of about 75% of the theoretical based on the mono- and di-alkyl sulfates going into reactor 1 is obtained, the crude product recovered via line 21 being secondary octyl alcohol, boiling 179° C., containing $C_8$ hydrocarbons boiling 120° C.–125° C. and a trace only of polymer boiling 220° C.+. The pure alcohol can be readily recovered from this product by redistillation.

With the feed-rates given in the table, and using reactors each of capacity 17.5 gallons, the average residence time of the whole reaction mixture is 40 minutes, and the average residence time of the oily layer in reactor 2 is 2.1 hours and in reactor 3 is 4.1 hours. These residence times, which are sufficient to insure complete hydrolysis of the di-alkyl sulfate, are thus obtained in a system having a total capacity of about 60 gallons. If, on the other hand, a tower hydrolyzer working without recycling were used, a capacity of 2,000 gallons would be required to give a four-hour residence time for the di-alkyl sulfate and, moreover, difficulties would be encountered owing to frothing.

In the preferred cascade flow apparatus which has been described, the levels of liquid in reactors 2 and 3 are controlled mainly by the balance between the hydrostatic pressure due to the oily layer in the reactor and that due to the aqueous phase (with a small supernatant oily layer) in the vertical limb of the appropriate discharge pipe 14 or 14a. In order to prevent surging and irregular operation, the feed rates of the reactants and steam should be kept relatively constant. It is also desirable to maintain a uniform smooth discharge from the reactors 2 and 3. This can be achieved either by violent agitation in or near the discharge outlets of the reactors so that the discharge consists of a dispersion of the oil phase in the aqueous phase, allowing separation to take place in the discharge pipes 14 and 14a, or by maintaining the liquid in the bottom of the reactor quiescent, as shown in the drawing, so that the oil phase is discharged as a steady continuous stream of oil droplets which rise in the acid in the discharge pipe. Steadiness of operation is also assisted by providing that the vapor line 18 is such that there is a low pressure drop along its length, and that the discharge pipes 14 and 14a are of sufficient cross-section to accommodate small surges without appreciable variation of the hydrostatic balance, and by providing the discharge pipes 14 and 14a with siphon breakers as shown.

While the cascade flow apparatus just described is preferred for carrying out the new process of the invention because this improved apparatus offers particular advantages in regard to construction and operating costs, nevertheless, other suitable forms of apparatus may be used in the process. Thus, for instance, pumping means may replace the hydrostatically balanced cascade system for the transfer of liquid mixture from reactor 2 to reactor 3 and from reactor 3 to separator 22. Alternatively, gravity flow through valve-controlled pipe lines may be used for such transfer of liquid mixture, the control valves in the transfer lines being regulated by liquid level indicating means in reactors 2 and 3 so as to insure the desired hold-up of oily layer relative to aqueous acid layer therein. The process described can also, if desired, be modified by carrying out a limited steam distillation in reactor 1. In this case the reflux condenser 23 would be replaced by a vapor off-take similar to the pipe 16 and cyclone 17, and likewise connected with the vapor line 18. As mentioned above, this would increase the residence time of the oily layer in reactors 2 and 3. Indirect heating instead of steam injection in reactor 1 is also feasible, particularly when no distillation is carried out in this reactor.

It will thus be seen that the process of the invention is capable of considerable variation not only in regard to the methods of operation which may be used but also in respect to the nature of the ester mixtures which may be treated. Thus, for example, instead of acid mixtures of mono- and di-alkyl sulfates, one may successfully treat in the same way mixtures of the corresponding mono- and di-alkyl phosphates or mixtures of mono-, di- and tri-alkyl phosphates. Still other variations in the process may be made without departing from the invention, and it will be understood that neither the new process nor the improved apparatus which has been provided is limited to the details disclosed by way of example nor by any theory proposed in explanation of the improved results which are obtained.

I claim as my invention:

1. A process for the production of alcohols which are sparingly soluble in water and are volatile in steam by acid hydrolysis of a mixture of the corresponding mono- and poly-esters of a polybasic inorganic acid, which comprises heating said mixture of esters in the presence of dilute aqueous inorganic acid to effect hydrolysis of at least a major part of the said mono-ester, passing the resulting mixture containing an oily phase comprising said poly-ester and an aqueous acid phase through a hydrolysis zone wherein said phases are at least partially separated and the aqueous phase is withdrawn at a faster rate than said oily phase to provide a longer residence time in the second of said hydrolysis zones for said poly-ester than for said aqueous acid phase, and subjecting the oily phase in said hydrolysis zone to heating with steam to bring about hydrolysis of at least a substantial part of said polyester content of the oily phase and to vaporize and remove alcohol therefrom.

2. A process for the production of alcohols which are sparingly soluble in water and are volatile in steam by acid hydrolysis of a mixture of the corresponding mono- and di-alkyl sulfates, which comprises heating said mixture of sulfates in the presence of a dilute sulfuric acid to effect hydrolysis of at least a major part of the mono-alkyl sulfate content, continuously passing the reaction product into a second reactor, separating the mixture in the second reactor into an aqueous acid phase and an oily phase containing di-alkyl sulfate, continuously withdrawing aqueous acid phase from said second reactor at a faster rate than the rate of withdrawal of oily phase therefrom to provide a longer residence time in the second reactor for said dialkyl sulfate than for said aqueous acid phase, and subjecting the oily phase in said second reactor to steam distillation to remove alcohol therefrom as vapor and bring about hydrolysis of di-alkyl sulfate.

3. A process for the production of secondary aliphatic alcohols of 7 to 9 carbon atoms per molecule from a mixture of the corresponding mono- and di-alkyl esters of an inorganic polybasic acid, which comprises heating said mixture of esters in the presence of a dilute aqueous solution of a strong inorganic polybasic acid to effect sufficiently complete hydrolysis of the mono-alkyl ester content to substantially suppress the frothing tendency of the mixture, and subjecting the resulting product to steam distillation to remove alcohol therefrom while simultaneously withdrawing from the mixture an oily upper layer and an aqueous acid lower layer, the rate of withdrawal of said acid layer being more rapid than the rate of withdrawal of said oily layer, whereby a longer residence time is provided for said oily layer than for said acid layer and hydrolysis of di-alkyl ester in said oily layer is effected.

4. A process for the production of an aliphatic alcohol having 5 to 12 carbon atoms per molecule from a mixture of mono- and di-alkyl sulfates of said alcohol, which comprises heating said mixture in the presence of sulfuric acid of 15% to 30% concentration on an organic-free basis for a period of 15 to 60 minutes to substantially hydrolyze the mono-alkyl sulfate content, passing the thus reacted mixture to a second hydrolysis zone wherein the mixture is separated into two liquid phases, an aqueous sulfuric acid phase and an oily phase containing the di-alkyl sulfate, injecting steam into the mixture to effect steam distillation of the alcohol present and bring about hydrolysis of said di-alkyl sulfate, and withdrawing from said second hydrolysis zone liquid oily phase and aqueous acid phase at rates controlled so that the oily phase has a materially longer residence time in the hydrolysis zone than said aqueous acid phase whereby hydrolysis of the dialkyl sulfate is effected without substantial conversion of alcohol to undesirable by-products.

5. A process according to claim 4 wherein the di-alkyl sulfate-containing oily phase is maintained under hydrolysis conditions for at least 4 hours.

6. A process for the production of a secondary aliphatic alcohol having 7 to 9 carbon atoms per molecule from a mixture of mono- and di-alkyl sulfates of said alcohol, which comprises heating said mixture in the presence of dilute aqueous sulfuric acid at 80° C. to 120° C. until substantial hydrolysis of said mono-alkyl sulfate takes place, passing the reacted mixture to a hydrolyzer wherein separation of the mixture into an oily liquid phase containing dialkyl sulfate and an aqueous sulfuric acid phase takes place, controlling the rates of withdrawal of liquid oily phase and aqueous acid phase so as to maintain said oily phase under hydrolysis conditions for a substantially longer period than said aqueous acid phase whereby hydrolysis of the dialkyl sulfate is effected without substantial conversion of alcohol to undesirable by-products, and simultaneously steam distilling off alcohol from the oily phase.

7. A process for the production of alcohols from a sulfation product of olefins having 5 to 12 carbon atoms per molecule containing mono- and di-alkyl sulfates and free sulfuric acid, which comprises diluting said sulfation product with sufficient water to reduce the sulfuric acid concentration so as not to exceed 30% on an organic-free basis after complete hydrolysis of the esters, heating the diluted mixture to substantially hydrolyze the mono-alkyl sulfate content, passing the thus reacted mixture through a hydrolysis zone wherein separation of an oily liquid phase containing di-alkyl sulfate from an aqueous acid phase is effected, withdrawing from said zone separated aqueous acid phase at a faster rate than oily liquid phase, and simultaneously steam distilling said oily phase to remove alcohol therefrom and hydrolyze di-alkyl sulfate without substantial conversion of the alcohol produced to undesirable by-products.

8. A continuous process of hydrolyzing an acid mixture of mono- and di-alkyl sulfates, which comprises passing said mixture through at least two separate hydrolysis zones in series, maintaining the mixture in the first zone at an elevated temperature and for a time at which substantial hydrolysis of the mono-alkyl sulfate content takes place while avoiding substantial phase separation, separating the mixture in the second zone into a liquid oily phase containing di-alkyl sulfate and an aqueous acid phase, injecting steam into said mixture in said second zone to effect hydrolysis of di-alkyl sulfate and distill off alcohol therefrom, and withdrawing from said second reaction zone liquid oily phase and aqueous acid phase at rates controlled so that the average residence time of liquid oily phase is greater than the average residence time of aqueous acid phase therein whereby hydrolysis of the dialkyl sulfate is effected without substantial conversion of alcohol to undesirable by-products.

LESLIE NEWTON GOLDSBROUGH.

References Cited in the file of this patent

UNITED STATES PATENTS

| Number | Name | Date |
| --- | --- | --- |
| 1,915,820 | Engs et al. | June 27, 1933 |
| 2,014,078 | Archibald et al. | Sept. 10, 1935 |
| 2,096,878 | Brooks | Oct. 26, 1937 |
| 2,160,177 | Shuman | May 30, 1939 |
| 2,474,569 | Bannon | June 28, 1949 |
| 2,475,095 | Hoek | July 5, 1949 |
| 2,496,251 | Mottern | Jan. 31, 1950 |